(12) United States Patent
Shivapuram et al.

(10) Patent No.: US 11,157,754 B2
(45) Date of Patent: Oct. 26, 2021

(54) ROAD MARKING DETERMINING APPARATUS FOR AUTOMATED DRIVING

(71) Applicant: Continental Automotive GmbH, Hannover (DE)

(72) Inventors: Bharath Shivapuram, Bengaluru (IN); Skanda Bharadwaj, Bangalore (IN); Venkatesh Munirathnam, Bangalore (IN)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 16/771,796

(22) PCT Filed: Nov. 30, 2018

(86) PCT No.: PCT/EP2018/083131
§ 371 (c)(1),
(2) Date: Jun. 11, 2020

(87) PCT Pub. No.: WO2019/115253
PCT Pub. Date: Jun. 20, 2019

(65) Prior Publication Data
US 2021/0097310 A1  Apr. 1, 2021

(30) Foreign Application Priority Data

Dec. 11, 2017  (EP) .................................... 17206307

(51) Int. Cl.
*G06K 9/00* (2006.01)
*G06K 9/46* (2006.01)

(52) U.S. Cl.
CPC ....... *G06K 9/00798* (2013.01); *G06K 9/4671* (2013.01)

(58) Field of Classification Search
CPC .................... G06K 9/00798; G06K 9/4671
See application file for complete search history.

(56) References Cited

U.S. PATENT DOCUMENTS

| 9,760,806 B1* | 9/2017 | Ning | G06N 3/0454 |
| 2007/0005609 A1* | 1/2007 | Breed | B60N 2/2863 |

(Continued)

OTHER PUBLICATIONS

International Search Report of the International Searching Authority for International Application PCT/EP2018/083131, dated Jan. 17, 2019, 2 pages, European Patent Office, HV Rijswijk, Netherlands.

(Continued)

*Primary Examiner* — Md K Talukder
(74) *Attorney, Agent, or Firm* — W. F. Fasse

(57) ABSTRACT

A road marking determining apparatus includes an image capturing device configured to obtain image data of a road, a first neural network and a second neural network. The the first neural network is configured to extract features in the obtained image data, wherein the extracted features are associated with the road marking. Further, the first neural network is configured to provide the extracted features to the second neural network. Finally, the second neural network is configured to determine the road marking based on the extracted features provided by the first neural network.

11 Claims, 2 Drawing Sheets

(56) References Cited

U.S. PATENT DOCUMENTS

| | | | |
|---|---|---|---|
| 2013/0202155 A1* | 8/2013 | Karanam | G06K 9/00798 |
| | | | 382/104 |
| 2018/0157972 A1* | 6/2018 | Hu | G06N 5/00 |
| 2019/0035101 A1* | 1/2019 | Kwant | G06N 3/0454 |
| 2019/0163990 A1* | 5/2019 | Mei | G01C 21/32 |

OTHER PUBLICATIONS

PCT Written Opinion of the International Searching Authority for International Application PCT/EP2018/083131, dated Jan. 17, 2019, 7 pages, European Patent Office, HV Rijswijk, Netherlands.

Extended European Search Report and Examination Report for European Patent Application No. 17206307.5, dated May 17, 2018, 7 pages, European Patent Office, Munich, Germany.

Jun Li et al., "Deep Neural Network for Structural Prediction and Lane Detection in Traffic Scene", IEEE Transactions on Neural Networks and Learning Systems, vol. 28, No. 3, Feb. 16, 2016, XP055352562, ISSN: 2162-237X, pp. 690 to 703.

Seokju LEE et al., "VPGNet: Vanishing Point Guided Network for Lane and Road Marking Detection and Recognition", IEEE International Conference on Computer Vision (ICCV), Oct. 22, 2017, XP033283058, pp. 1965 to 1973 (pp. 1947 to 1955 in the Open Access Version provided by Computer Vision Foundation).

Martin Woellmer et al., Online Driver Distraction Detection Using Long Short-Term Memory, IEEE Transactions on Intelligent Transportation Systems, vol. 12, No. 2, Jun. 1, 2011, XP011480052, ISSN: 1524-9050, pp. 574 to 582.

Mohamed ALY, "Real Time Detection of Lane Markers in Urban Streets", Computational Vision Lab, Electrical Engineering, California Institute of Technology, 2008 IEEE Intelligent Vehicles Symposium, Jun. 4, 2008, ISBN 978-1-4244-2568-6, arXiv: 1411.7113 [cs. CV] 6 pages.

Vijay Badrinarayanan et al., "SegNet: A Deep Convolutional Encoder-Decoder Architecture for Image Segmentation", arXiv:1511.00561v3 [cs. CV], Oct. 10, 2016, pp. 1 to 14; IEEE Transactions on Pattern Analysis and Machine Intelligence, vol. 39, No. 12, Dec. 2017, pp. 2481 to 2495.

* cited by examiner

ROAD MARKING DETERMINING APPARATUS FOR AUTOMATED DRIVING

FIELD OF THE INVENTION

The invention relates to a road marking determining apparatus, a vehicle comprising the road marking determining apparatus, a method, a program element, and a computer-readable medium.

BACKGROUND INFORMATION

Since the beginning of the development of motor vehicles, comfort of the passengers is an important criterion. Some important milestones thereof are the air suspension, the parking assist and the cruise control. Especially in the last 10 years, numerous other active comfort functions for vehicles have been developed, such as autonomous driving functions. The world and research in automotive domain are moving from Advanced Driver Assistance System (ADAS) to Automated Driving (AD). The key feature for making automated driving successful is to ensure that the entire scene has been understood, wherein traffic signs and road markings play a vital role. Neural networks are proven to be highly successful in recognition and classification tasks, because neural networks are capable of automatically learning complex features.

SUMMARY OF THE INVENTION

It may be an object of the present invention to recognize road markings on a road and to improve driving safety.

As the number of vehicles on the road rises, the probability of viewing a road marking in its entirety decreases. For example, the road marking, which the system would like to recognize, may be occluded by other vehicles or obstacles.

The methods in the prior art do not take into consideration the difficulties of normal road scenarios like
1. Occlusion due to traffic: During normal traffic it is very difficult to see the entire road marking in a single frame or image of image data as the vehicles ahead may occlude the view of the road markings. Thus, it is difficult to detect and classify the road marking or it may lead to many misclassifications.
2. Elongated road marking: Generally, the entire road marking may be visible within the visible range of the image capturing device, if it's not occluded by an oncoming vehicle. However, there are cases where the entire marking may not be visible, as it may extend over a large distance.

Generally, hand crafted features like Histogram of Oriented Gradients (HOG) are used to extract and classify a road marking. However, this method does not work well under high traffic scenarios or when the visibility of the road marking span over multiple frames or images of image data.

A first aspect of the invention is related to a road marking determining (or recognition) apparatus. This road marking determining apparatus comprises an image capturing device, which is configured to obtain image data of a road, a first neural network and a second neural network. The image capturing device is further configured to provide the first neural network with the obtained image data, and the first neural network is configured to extract features in the obtained image data, wherein the extracted features are associated with the road marking. Further, the first neural network is configured to provide the second neural network with the extracted features. Finally, the second neural network is configured to determine the road marking based on the provided features of the first neural network.

The road marking determining apparatus determines the road marking even if the road marking is not completely visible at a given time (i.e. in one frame or image of the image data), due to the fact that the road marking extends over a longer distance on the road (elongate road marking) and in cases where the visibility of the road marking is occluded by other vehicles covering the road marking.

Therefore, the road marking determining apparatus solves the following problems:
1. The problem of visibility of road markings during scenarios with high traffic or traffic jams.
2. Elongated road marking, which spans over a larger distance and is not visible as a whole in one single frame or image.

The image data input to the road marking determining apparatus through the image capturing device may be a video stream or sequence, a plurality of images or a plurality of image frames. The road marking determining apparatus processes the image data sequentially, thus one image or frame after another. The first neural network extracts features associated with the road marking in each one of the single images or frames or in every single image.

The first neural network works as a feature extractor. For this purpose a pre-trained neural network may be used. This may, avoid the need for training the first neural network from scratch. The features extracted may then be converted into a 1D vector and may be passed to the second neural network. The features extracted by the first neural network may be elements in certain colours, such as white, yellow, red, blue or green elements on the road in front of the vehicle. Thus, elements which show a contrast to the dark colour of the tarmac or concrete road. In particular, the extracted features may be an edge between the road marking and the road.

Further, after the first neural network has extracted the features, the features are provided to the second neural network, which may have at least two gates such as input and forget gates, and optionally output gates, which allow better control over gradient flow and enable better preservation of "long range dependencies". The second neural network may be a dense neural network, which may consist of one array of memory layers followed by one dense layer with some dropout layers in between. The output of the second neural network may indicate the class of the road marking. Thus, the extracted features of the first neural network may be analysed in the second neural network as a whole by combining the plurality of features for determining the road marking.

In other words, the determination of the road marking may be achieved in two separate steps performed by two separate neural networks, i.e. the first neural network and the second neural network. The first step is performed by the first neural network, for example a convolutional neural network, which extracts features out of image data, such as a video or an image. The second step is performed by the second neural network, for example a long short-term memory, which receives the extracted features of the neural network and determines the road marking by taking into account features extracted over a period of time. The combination of a convolutional neural network and a long short-term memory may enable a reliable and repeatable determination of the road marking, even if the road marking is not completely visible in one single frame or image of the image data. This may be the case, if another vehicle on the road partially occludes the road marking or the road marking is an elongate road marking. Thus, the road marking determining apparatus may determine a road marking in image data by storing, buffering and merging important features of the obtained image data.

A road marking according to this application may be a marking painted or glued on a road, such as an arrow showing the direction, a speed limit, a crosswalk, a no-parking zone, a no-stopping zone, a bus stop, a special lane (e.g. carpool or bus), a give-way sign, a stop sign and/or a bike path.

According to an embodiment of the invention, the first neural network is a convolutional neural network (CNN) and the second neural network is a long short-term memory (LSTM).

The first neural network may comprise a plurality of layers with a plurality of nodes. The nodes of the layers may be connected to other nodes of other layers to form the first neural network. Further, each connection may have their one weight. It should be noted that the number of layers is not limited. Furthermore, the first neural network is configured to learn autonomously. This may be achieved by training the first neural network previously or during operation of the first neural network.

The second neural network may be a simple neural network, which may contain recurrent connections between the sole layers and/or nodes. The second neural network may comprise four elements: a cell, an input gate, an output gate and a forget gate. The cell is responsible for "remembering" values over arbitrary time intervals (hence the word "memory" in Long short-term memory). Each of the three gates may be thought of as a "conventional" artificial neuron, as in a multi-layer (or feedforward) neural network: that is, they compute an activation (using an activation function) of a weighted sum. Each one of the gates may have its own parameters, like weights and biases. Intuitively, they may be thought of as regulators of the flow of values that goes through the connections of the second neural network (hence the denotation "gate"). The cells and the gates may be connected by connections. It should be noted that the connections may be recurrent or not. Their output may be multiplied with the output of the cell or the input to the long short-term memory to partially allow or deny information to flow into or out of the memory. More specifically, the input gate may control the extent to which a new value flows into the memory, the forget gate may control the extent to which a value remains in memory and the output gate may control the extent to which the value in memory is used to compute the output activation of the LSTM block.

Alternatively or in addition, the input and forget gates may be merged into a single gate.

The expression long short-term refers to the fact that the long short-term memory is a neural network for the short-term memory, which may last for a long period of time.

According to a further embodiment of the invention, the obtained image data comprises at least two consecutive images, which have been captured at different times, and each one of the images show only a part of the road marking.

The obtained image data may be a video sequence or stream or a plurality of single or independent images or frames. The single images should have a similar angle of view and the time between the images should not extend beyond a predetermined threshold, such as for example 15 s. The first neural network extracts the features out of each one of the single frames or images and provides the extracted features to the second neural network. The second neural network may be configured to analyse the extracted features of the obtained image data in a whole. Thus, combine the features of a plurality of frames or images. Further, the second neural network may be configured to determine the road marking based on the extracted features of the plurality of frames or images.

According to a further embodiment of the invention, the image capturing device is a camera.

The image capturing device may be also an interface for receiving image data from other sources, such as over the air or from an external camera.

A further aspect of the invention is related to a processor. The processor is configured to:
  extract features in an image data set by a first neural network, wherein the features are associated with a road marking;
  provide the extracted features to a second neural network; and
  determine, by the second neural network, the road marking from the extracted features in the obtained image data.

In a first step, the processor may receive image data of a road. The processor may be configured to extract features out of the received image data, which are associated with the road marking. This may be achieved by the first neural network, for example a convolutional neural network, executed by or running on the processor. In a further step, the processor may be configured to provide the extracted features to the second neural network, for example the long short-term memory. Alternatively or in addition, the processor itself may execute the second neural network. Finally, the processor may execute the second neural network to determine the road marking on the road based on the extracted features of the first neural network.

It should be noted that the processor may be embedded in a circuit or an electronic control unit (ECU) of a vehicle. Further, besides the processor, also inputs, outputs (e.g. interfaces) and a memory may be part of the circuit or the ECU.

The terms "processor", "control device", "control unit" and "control circuit" may be used interchangeably and they fulfil the same or similar function according to this application.

According to a further aspect of the invention, a vehicle comprising a road marking determining apparatus is provided.

The vehicle may, for example, be a motor vehicle, such as a car, bus or truck.

An aspect of the invention relates to a method for determining a road marking on a road, wherein the method comprises the following steps:
  obtaining image data of the road;
  extracting features, which are associated with the road marking, in the obtained image data by a convolutional neural network (CNN);
  providing a long short-term memory (LSTM) with the features of the obtained image data extracted by the convolutional neural network (CNN); and
  determining, by the long short-term memory (LSTM), the road marking from the extracted features of the obtained image data.

According to an embodiment of the invention, the image data comprises at least two consecutive images, which have been captured at different times.

Advantageously, the obtained image data contains more than one single frame or image, such as a video sequence or stream or a plurality of single consecutive images. Further, as the information of more than one image should be combined to determine the road marking, the plurality images should be captured at different times or the video stream should be a continuous video stream.

According to a further embodiment of the invention, each one of the consecutive images show only a part of the road marking.

In other words, the road marking which should be determined is not completely visible in one single image or frame of the obtained image data.

According to a further embodiment of the invention, the convolutional neural network and the long short-term memory are trained together.

To achieve optimal determination and recognition results of the road marking, the first neural network and the second neural network, thus, the convolutional neural network and the long short-term memory, are trained and fine-tuned, respectively, together. Thus, the second neural network may be optimized for recognition based on features, which have been extracted by the first neural network.

Training a neural network essentially means selecting one model from the set of allowed models that minimizes the cost. Numerous algorithms are available for training neural network models, most of them may be viewed as a straightforward application of optimization theory and statistical estimation.

Most employ some form of gradient descent, using backpropagation to compute the actual gradients. This is done by simply taking the derivative of the cost function with respect to the network parameters and then changing those parameters in a gradient-related direction.

A neural network or the combination of two neural networks may be trained with training data before it is put into operation. The layers may consist of interconnected nodes. The nodes are each assigned activation functions. The connections between the nodes may be quantified by weights. During training, these nodes may be created in the individual layers after the weights by which the individual layers and/or nodes are connected have been initialized. The nodes in the layers may each be responsible for a particular feature or feature component in the later operation of the neural network. During training, the outputs of the neural network may be matched with a desired output of the neural network (how the output should be). The output may be optimized for the desired output by means of the nodes, the layers and the weights between the layers, so that the trained neural network generates the desired output for specific input data.

According to another aspect of the invention, there is provided a computer program element for controlling the road marking determining apparatus as previously described which, when the computer program element is executed by a processing unit, is adapted to perform the method steps as previously described.

There is also provided a computer readable medium having stored the computer element as previously described.

Advantageously, the benefits provided by any of the above aspects equally apply to all of the other aspects and vice versa.

The above aspects and examples will become apparent from and be elucidated with reference to the embodiments described hereinafter.

BRIEF DESCRIPTION OF THE DRAWINGS

Exemplary embodiments will be described in the following with reference to the following drawings.

DETAILED DESCRIPTION OF EXAMPLE EMBODIMENTS OF THE INVENTION

Figure 1:
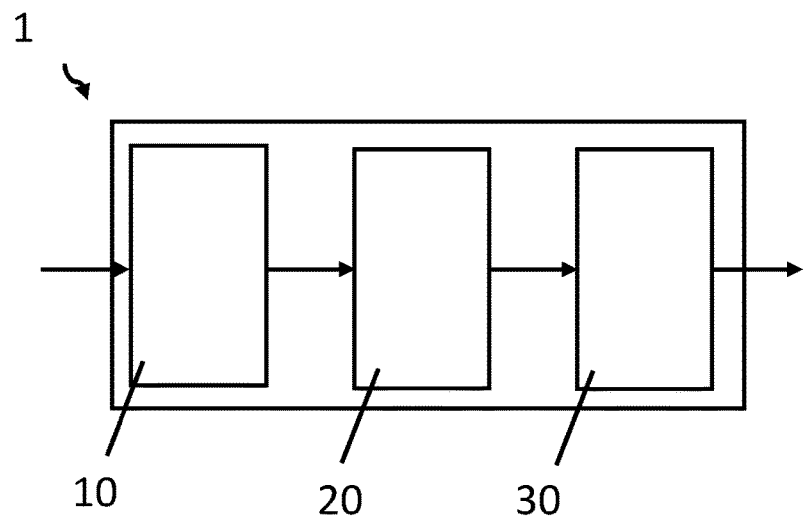
FIG. 1 shows a block diagram of a road marking determining apparatus according to an embodiment of the invention.

FIG. 1 shows a schematic block diagram of a road marking determining apparatus 1. The road marking determining apparatus 1 comprises an image capturing device 10, a first neural network 20, for example a convolutional neural network, and a second neural network 30, for example a long short-term memory. The image capturing device 10 may be a camera or an interface to obtain image data from another entity such as a camera. The image capturing device 10 obtains image data of a road and provides the first neural network 20 with the obtained image data, in particular, a convolutional neural network (CNN). The image data may contain a plurality of single frames or images, which were captured consecutively. The first neural network 20 may be configured to extract particular features out of each one of the provided frames or images. These extracted features may be associated with a road marking on a road. For example colours, such as white, yellow, red, green or blue in contrast to dark colour of tarmac or concrete of the road. Subsequently, the first neural network 20 provides the second neural network 30, in particular a long short-term memory, with the extracted features. The second neural network 30 determines the road marking on the road based on the provided features of the first neural network 20. The second neural network 30 may analyse the features of the plurality of frames or images as a whole by combining the features. In a subsequent process, the determined road marking may be used to control a vehicle, e.g. automated driving, or some function of a vehicle.

Figure 2:
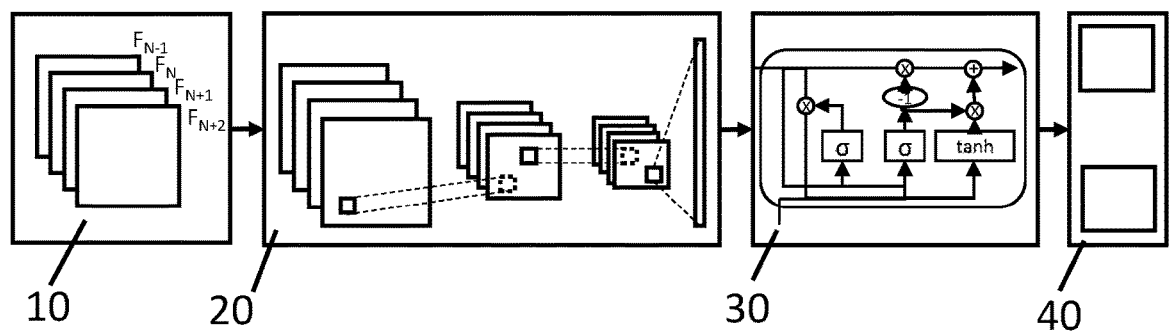
FIG. 2 shows a diagram of input data, a de convolutional ep neural network, a long short-term memory and output data according to an embodiment of the invention.

FIG. 2 shows a more detailed diagram of the road marking determining apparatus 1. The image capturing device 10 obtains a plurality of consecutive images, which have been captured at different points of time. These are indicated in FIG. 2 by a plurality of squares behind each other with the labeling $F_{N-1}$, $F_N$, $F_{N+1}$ and $F_{N+2}$, wherein each square indicates a single frame or an image and $F_N$ indicates the time of capturing the image. The obtained image data may be named as input data. These obtained images would be transmitted to the first neural network 20, wherein the first neural network 20 may be a convolutional neural network with a plurality of different layers, nodes, connections and different weights between the sole elements of the first neural network 20. The different layers of the first neural network 20 were indicated by the plurality of squares behind each other in different sizes. The connection between the layers of the first neural network 20 are indicated by the dotted lines. Each layer of the first neural network 20 may be optimized to recognize and extract a particular feature or each layer may be assigned to a different part of the images. The extracted features would be provided to the second neural network 30. The second neural network 30 may be a long short-term memory, which receives the extracted features from the first neural network 20. The second neural network 30 may be configured to classify the extracted features according to their importance and to merge or combine extracted features from the first neural network over a certain period of time. In other words, the second neural network stores certain features extracted by the first neural network 20 and combines them with newly extracted features of the first neural network 20 to determine the road marking. By doing so, the second neural network 30 is configured to determine the road marking based on the extracted features of the first neural network over a plurality of single images or frames. The advantages of combining two specialized neural networks may be that a road marking can be determined, even if it's partially occluded (through other vehicles) or if it's an elongate road marking, which does not fit in one single frame or image of the capturing device 10.

Figure 3:
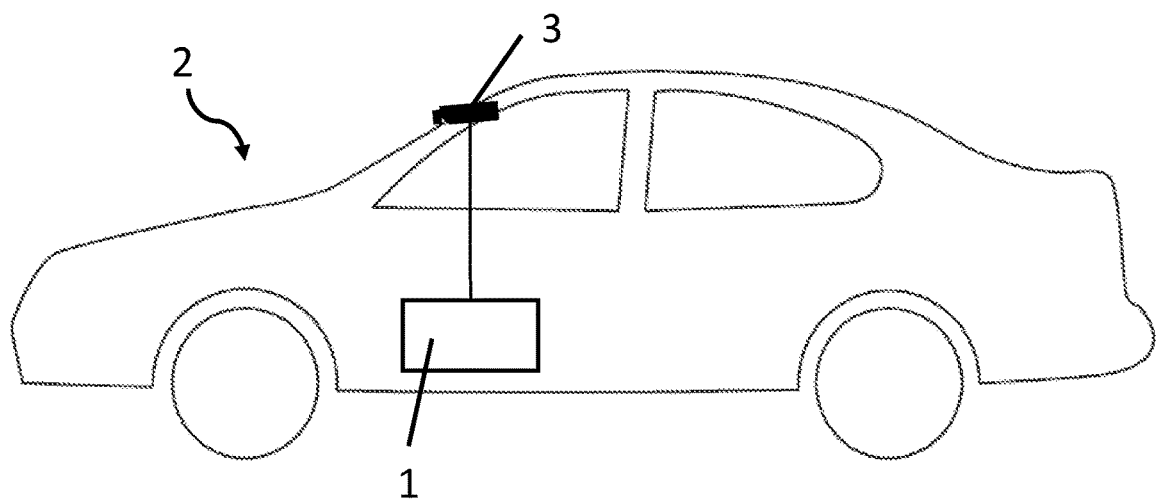
FIG. 3 shows a schematic set up of a vehicle with the road marking determining apparatus and a camera according to an embodiment of the invention.

FIG. 3 shows a vehicle 2 with a road marking determining apparatus 1 and a camera 3. The road marking determining apparatus 1 may be integrated in a control unit, control circuit, control device or processor of the vehicle. Alternatively or in addition, the road marking determining apparatus 1 can be directly integrated in the camera 3 or the camera control unit of the vehicle. Further, the road marking determining apparatus 1 may be able to access and use the information of other units, devices, sensors or circuits of the vehicle. 2, such as the front camera 3, for determining the road marking on a road.

Figure 4:
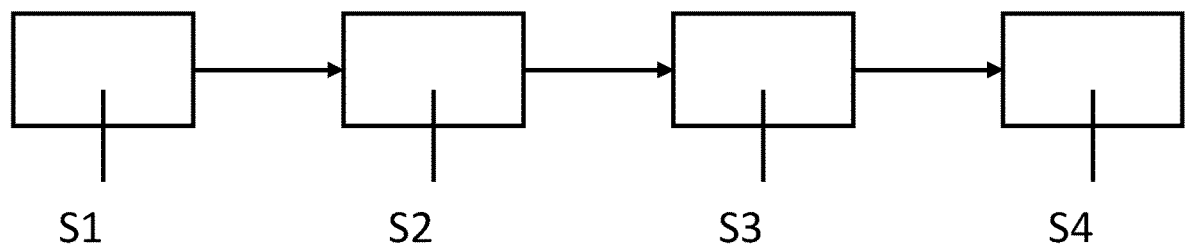
FIG. 4 shows a flow chart of a method for determining a road marking according to an embodiment of the invention.

FIG. 4 shows a flow chart of a method for determining a road marking on a road. In a first step S1, image data of a road with the road marking is obtained, preferably by an image capturing device. In step S2 the obtained image data is transmitted to a convolutional neural network and the convolutional neural network extracts features, which are associated with the road marking. In step S3 the convolutional neural network provides a long short-term memory with the extracted features. Finally, in step S4, the road marking is determined by the long short-term memory based on the extracted features in the obtained image data.

The invention claimed is:

1. A road marking determining apparatus comprising:
an image capturing device configured to obtain image data of a road, wherein the image data comprises at least two images of the road that have been captured at different times, and each one of the images respectively shows only a respective portion of a road marking on the road;
a first neural network comprising a convolutional neural network; and
a second neural network comprising a long short-term memory;
wherein the first neural network and the second neural network are separate from one another,
wherein the image capturing device is configured to provide the image data to the first neural network,
wherein the first neural network is configured to extract features in the image data, wherein the extracted features are associated with the road marking, and wherein the first neural network processes the images sequentially one after another and extracts one or more of the features respectively from each one of the images,
wherein the first neural network is configured to provide the extracted features to the second neural network, and wherein the second neural network is configured to determine the road marking based on the extracted features provided by the first neural network.

2. The apparatus according to claim 1, wherein the image capturing device is a camera.

3. A vehicle comprising the apparatus according to claim 1 and a vehicle body on which the apparatus is installed.

4. The determining apparatus according to claim 1, wherein the second neural network is configured to determine the road marking by analyzing the extracted features of the image data as a whole by combining ones of the extracted features from a plurality of the images captured over time.

5. The apparatus according to claim 4, wherein the second neural network is configured to combine the ones of the extracted features by storing, buffering and merging the ones of the extracted features over time.

6. A processor, configured to
obtain image data of a road, wherein the image data comprises at least two images of the road that have been captured at different times, and each one of the images respectively shows only a respective portion of a road marking on the road;
extract features in the image data by a first neural network comprising a convolutional neural network, wherein the features are associated with a road marking, and wherein the first neural network processes the images sequentially one after another and extracts one or more of the features respectively from each one of the images;
provide the extracted features to a second neural network comprising a long short-term memory, wherein the first neural network and the second neural network are separate from one another; and
determine, by the second neural network, the road marking from the extracted features.

7. A vehicle with a processor according to claim 6.

8. A method of determining a road marking on a road comprising the following steps:
obtaining image data of the road, wherein the image data comprises at least two images of the road that have been captured at different times, and each one of the images respectively shows only a respective portion of the road marking;
extracting features, which are associated with the road marking, in the obtained image data by a convolutional neural network by processing the images sequentially one after another and extracting one or more of the features respectively from each one of the images;
providing the extracted features from the convolutional neural network to a long short-term memory separate from the convolutional neural network; and
determining, by the long short-term memory, the road marking from the extracted features provided by the convolutional neural network.

9. The method according to claim 8, further comprising training the convolutional neural network and the long short-term memory together with one another.

10. A computer program element, which when executed by a processor is configured to carry out the method according to claim 8.

11. A computer readable medium, on which a computer program element according to claim 10 is stored.

* * * * *